(12) United States Patent
Sahin et al.

(10) Patent No.: US 12,306,942 B2
(45) Date of Patent: May 20, 2025

(54) IDENTIFYING SECURITY EVENTS IN PROGRAMMING CODE FOR LOGGING

(71) Applicant: SAP SE, Walldorf (DE)

(72) Inventors: Merve Sahin, Antibes (FR); Cedric Hebert, Mouans Sartoux (FR); Noemi Daniele, Milan (IT); Francesco Di Cerbo, Antibes (FR)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 17/880,385

(22) Filed: Aug. 3, 2022

(65) Prior Publication Data

US 2024/0045955 A1 Feb. 8, 2024

(51) Int. Cl.
*G06F 21/56* (2013.01)
*G06F 21/55* (2013.01)
*G06N 20/00* (2019.01)

(52) U.S. Cl.
CPC .......... *G06F 21/563* (2013.01); *G06F 21/552* (2013.01); *G06N 20/00* (2019.01); *G06F 2221/033* (2013.01)

(58) Field of Classification Search
CPC .............................. G06F 21/563; G06F 21/552
See application file for complete search history.

(56) References Cited

U.S. PATENT DOCUMENTS

| 9,350,749 | B2 | 5/2016 | Hebert et al. |
| 10,607,015 | B1* | 3/2020 | Hecht ........................ G06F 9/54 |
| 2019/0122258 | A1* | 4/2019 | Bramberger ............. G06N 3/08 |
| 2019/0305957 | A1* | 10/2019 | Reddy ........................ G06F 8/60 |
| 2020/0019704 | A1* | 1/2020 | Tora ...................... G06F 21/567 |
| 2021/0124830 | A1* | 4/2021 | Dinh ...................... G06F 21/577 |
| 2021/0256209 | A1* | 8/2021 | Rafey .................. G06F 40/295 |
| 2022/0179731 | A1* | 6/2022 | Jung ................... G06F 11/3604 |
| 2023/0038196 | A1* | 2/2023 | Labreche .............. G06F 21/577 |

OTHER PUBLICATIONS

"OWASP Top Ten Web Application Security Risks," owasp.org, visited Jun. 30, 2022, 5 pages.
"Latent Dirichlet allocation," *Wikipedia*, visited Jun. 30, 2022, 8 pages.

(Continued)

*Primary Examiner* — William S Powers
(74) *Attorney, Agent, or Firm* — Klarquist Sparkman, LLP

(57) ABSTRACT

A trained machine learning model can determine whether a portion of programming code contains a security event. The determination can be included in a security assessment. The category of security event can also be determined. During training, observed portions of programming code labeled according to whether they contain a security event and the category of security event can be tokenized. Vectors can be generated from the tokens. The machine learning model can generate a new vector for an incoming portion of programming code and compare against combined vectors for the observed portions of programming code. A security assessment can indicate whether the incoming portion of programming code contains a security event, the category of the event, or both. For training purposes, security logging statements can be removed from training code.

18 Claims, 18 Drawing Sheets

(56) References Cited

OTHER PUBLICATIONS

King et al., Log your crud: design principles for software logging mechanisms, HotSoS '14, Apr. 8, 2014, Raleigh, North Carolina, USA, 10 pages.

Li et al., "Where shall we log? studying and suggesting logging locations in code blocks," ACM, ASE '20, Sep. 21, 2020, 12 pages.

Chen et al. "Studying the use of java logging utilities in the wild," ACM ICSE '20, May 23-29, 2020, Seoul, Republic of Korea, 12 pages.

He et al. "Characterizing the natural language descriptions in software logging statements," ACM ASE '18, Sep. 3-7, 2018, Montpellier, France, 12 pages.

Li et al. "Studying software logging using topic models," Empir Software Eng., https://doi.org/10.1007/s10664-018-9595-8, Springer Science+Business Media, part of Springer Nature 2018, published online Jan. 30, 2018, 42 pages.

Ortiz et al. "Towards automated logging for forensic-ready software systems," 2019 IEEE 27th International Requirements Engineering Conference Workshops (REW), IEEE, 2019, 7 pages.

* cited by examiner

FIG. 12

TOKENS 1220

- USER, NAME, PASSWORD, COMPANY, FACTORIES, SYSTEM, API, LOCATOR, EMAIL, LORGIN, AUTHENTICATOR, LDAP, AUTH ....

- HTTP, SERVLET, RESPONSE, NAME, VALUE, HEADER, SAFE, STRIPPED, SECURITY, CONFIGURATION ....

- CREDENTIAL, SIGNATURE, PREDICATE, SIGNING, STREAM, TEXT, APPLY

↓ LDA MODEL TRAINING

TOPICS 1230

TOPIC 0: USERNAM, USER, LOAD, SECURITYGROUP, STOP, PROPERTI, PASSWORD, LOGIN, REQUEST, SECUR

TOPIC 1: GROUP, SECUR, CREAT, ROLE, INITI, PERMISS, DOMAIN, PRINCIP, DELET, EXIST

...

TOPIC N: MESSAG, CHECK, ERROR, REQUEST, OCCUR, SEND, AUDIT, RECEIV, SERVER, SECUR

SECURITY EVENT ASSESSMENT – ADD SECURITY LOGGING STATEMENT

*SOURCE 1610*

RESULTS:

| ☐ METHOD | EVENT TYPE | PRESENT? |
|---|---|---|
| ☑ METHOD 1 | VALIDATION FAILURE | Y |
| ☐ METHOD 2 | CRYPTOGRAPHY | Y |
| ☐ METHOD 3 | - | N |
| ☑ METHOD 4 | AUTHORIZATION | Y |
| ☑ METHOD 5 | VALIDATION FAILURE | Y |
| ☐ METHOD 6 | - | N |

1650

ADD 1620    CANCEL

1600

IDENTIFYING SECURITY EVENTS IN PROGRAMMING CODE FOR LOGGING

FIELD

The field generally relates to software security, and particularly to programming code analysis to identify security events for logging.

BACKGROUND

Logging of security events is critical. Unfortunately, programmers often fail to include statements in their code to log security events, leading to a recognized and widespread problem of inadequate security logs.

Inadequate security logging leads to a variety of problems, including being unable to reconstruct what happened during a security breach incident. So, there remains a need to improve security logging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises receiving an input portion of programming code; generating tokens from the input portion of the programming code; with a trained machine learning model, generating an internal stored representation of the input portion of the programming code based on the tokens and determining whether the input portion of the programming code contains a security event, wherein the trained machine learning model is trained with training programming code labeled according to whether or not the training programming code contains security events and generates one or more vectors from the tokens; and outputting a security event assessment, wherein the security event assessment comprises an indication of whether the input portion of the programming code contains a security event, and the indication is based on the one or more vectors.

In another embodiment, a computing system comprises at least one hardware processor; at least one memory coupled to the at least one hardware processor; an input portion of source code; a trained machine learning model trained with observed portions of source code known to have security events; and one or more non-transitory computer-readable media having stored therein computer-executable instructions that, when executed by the computing system, cause the computing system to perform receiving the input portion of programming code; with the trained machine learning model, determining whether or not the input portion of programming code contains a security event; and outputting a security event assessment, wherein the security event assessment comprises an indication of whether the input portion of the programming code contains a security event, and the indication is based on one or more vectors].

In another embodiment, one or more non-transitory computer-readable media comprising computer-executable instructions that, when executed by a computing system, cause the computing system to perform operations comprising receiving an input portion of source code; generating tokens from the input portion of the source code; with a trained Latent Dirichlet Allocation (LDA) machine learning model, generating a topic vector representation of the tokens; with the topic vector representation of the tokens, determining whether or not the input portion of source code contains a security event; responsive to determining that the input portion of source code contains a security event, determining a security event category of the security event with the topic vector representation of the tokens; and outputting an indication of adding a security event logging statement of the determined security event category for the input portion of the source code.

As described herein, a variety of other features and advantages can be incorporated into the technologies as desired.

BRIEF DESCRIPTION OF THE DRAWINGS

FIG. 12 is a block diagram showing topic construction as part of machine learning model training

FIG. 16 is a block diagram of a user interface indicating results of security event assessment.

DETAILED DESCRIPTION

Example 1—Overview

Inadequate security logging is a recognized, widespread problem that poses a significant challenge to software security. Due to the sheer volume of existing code and new code being developed, it would seem to be an impossible task to remediate old code or ensure that new code contains sufficient security logging functionality.

Conventionally, security logging functionality relies on the expertise of programmers to identify when code involves a security event and then to take the time to actually include a statement in the code to generate a log entry. Unfortunately, if either of these is lacking, there will be no logging statement. Consequently, no log entry will be generated by the software, and the security log will be silent regarding the security event.

As described herein, machine learning can be applied to determine whether programming code contains a security event. A security event assessment can then be output that indicates whether the programming code contains a security event. As described herein, a category of the security event can also be determined.

The described technologies thus offer considerable improvements over conventional techniques for security logging.

As described herein, determining whether programming code contains a security event can be a first step toward generating a security logging statement, which then results in a security log entry.

In practice, the indication that the programming code contains a security event can trigger further actions, including adding a security logging statement to the programming code. Such a statement ultimately generates a security log entry, which improves overall security event logging.

Improving security event logging can have various benefits as described herein. For example, security incident response typically involves reconstructing what happened and how an attacker gained access. Also, knowing where security events take place can be useful for placing honeytokens as described herein. On a general level, security logging can play an important role in determining what took place during the incident. Other benefits include improving security auditing, detecting security weaknesses or bugs, and the like.

Figure 1:
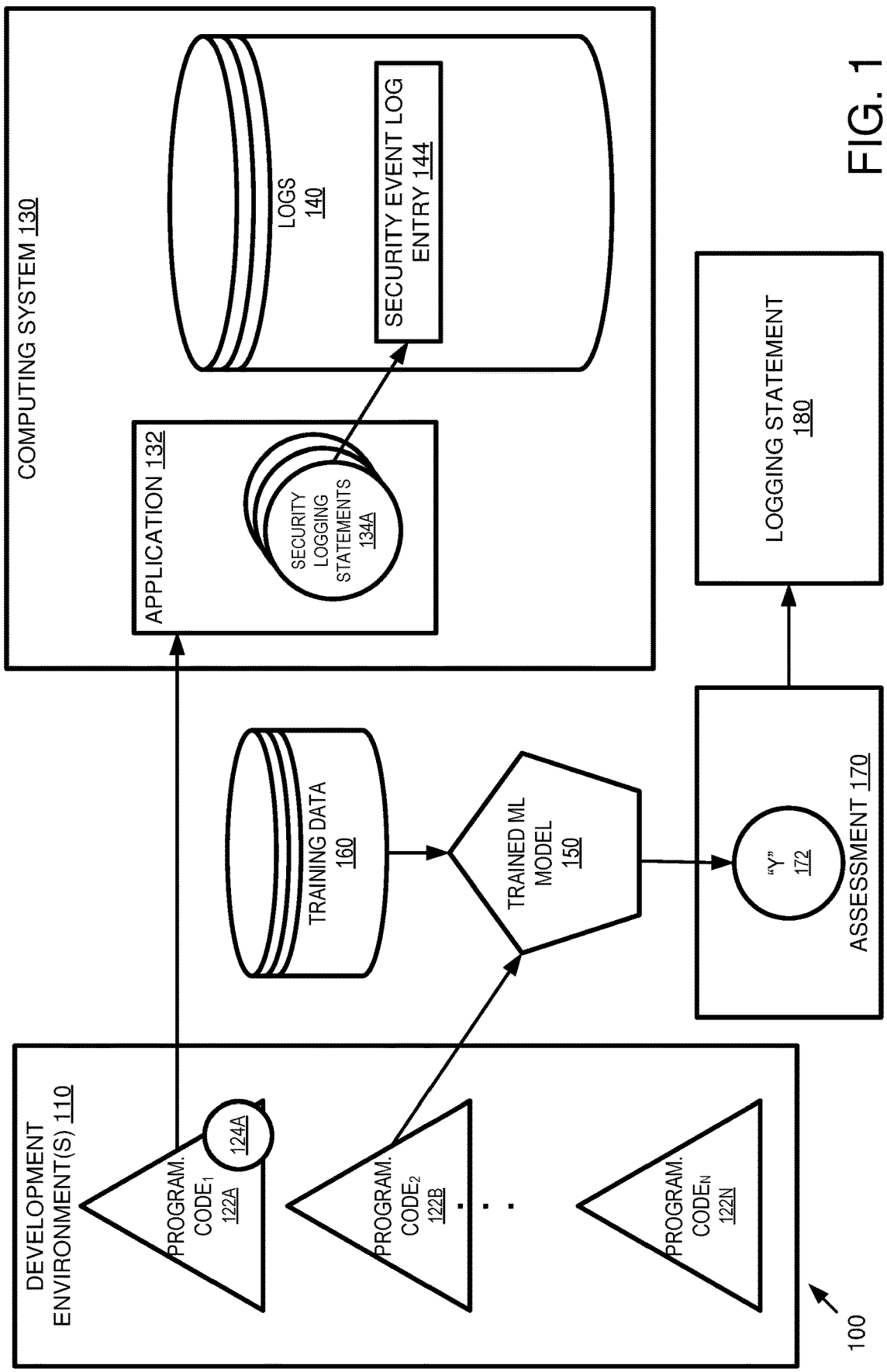
FIG. 1 is a block diagram of an example system training a machine learning model identifying security events in programming code for logging.

Example 2—Example System Identifying Security Events in Programming Code for Logging FIG. 1 is a block diagram of an example system 100 implementing identifying security events in programming code for logging. In the example, the system 100 can include one or more development environments 110 that contain portions 122A-N of programming code, some of which may contain security logging statements 124A.

The portions 122A-N programming code can ultimately be executed within an application 132 that contains executable security logging statement 134A (e.g., generated from the statement 124A) that generates a security event log entry 144 in the logs 140 of a computing system 130.

As shown the system 100 can include training data 160 that is used to generate a trained machine learning model 150, which, given a portion of programming code 122B as input, generates a security event assessment 170, which includes an indication 172 of whether the portion 122B contains a security event. As described herein, the assessment can also include an indication of a category of the event.

Based on the assessment 170 (e.g., the indication 172 that the portion does contain a security event), a logging statement 180 can be generated and included in the portion 122B of programming code, ultimately resulting in another security event log entry that logs the detected security event during future execution.

Any of the systems herein, including the system 100, can comprise at least one hardware processor and at least one memory coupled to the at least one hardware processor.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, the training data 160 can include a significant amount of training data and test data so that determinations can be validated. There can be additional functionality within the training process. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the training data 160, trained model 150, the assessment 170, the logs 140, the logging statement 180, and the like can be stored in one or more computer-readable storage media or computer-readable storage devices. The technologies described herein can be generic to the specifics of operating systems or hardware and can be applied in any variety of environments to take advantage of the described features.

Figure 2:
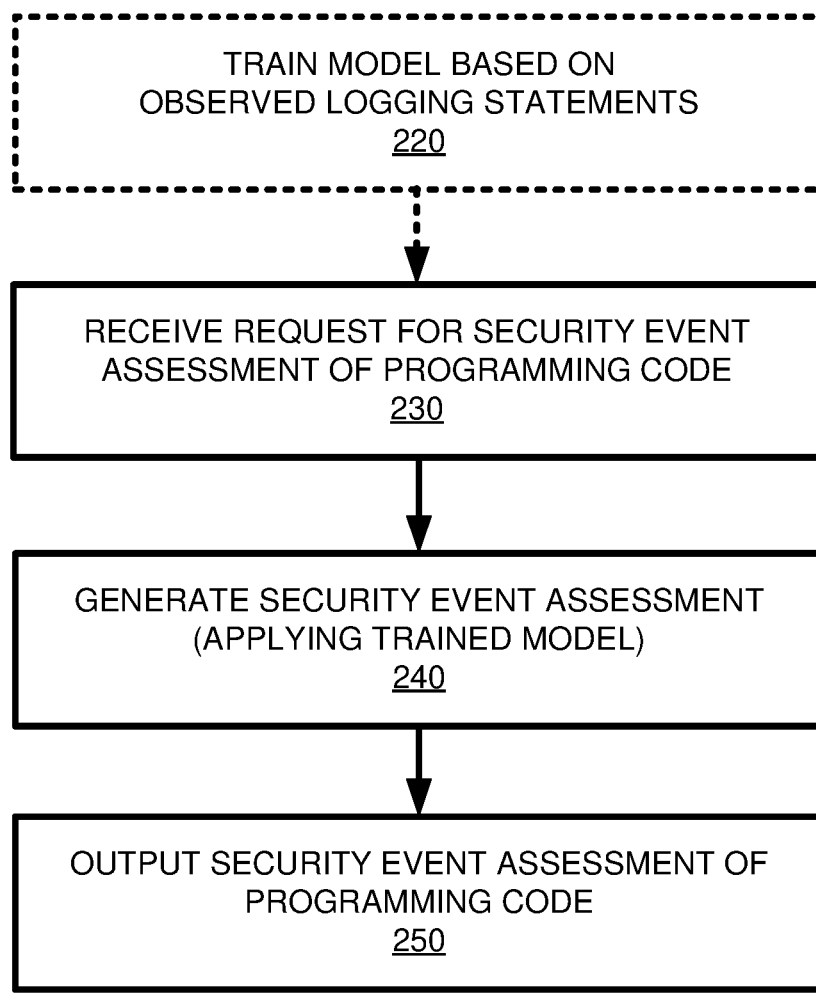
FIG. 2 is a flowchart of an example overall method of training a machine learning model and identifying security events in programming code for logging.

Example 3—Example Method Identifying Security Events in Programming Code for Logging FIG. 2 is a flowchart of an example method 200 of identifying security events in programming code for logging and can be performed, for example, by the system of FIG. 1.

In the example, at 220, a machine learning model is trained based on observed logging statements (e.g., portions of programming code that are known to contain security log events as evidenced by their containing a security logging statement).

At 230, a request for a security event assessment of programming code is received.

At 240, responsive to the request, a security event assessment is generated with a trained machine learning model (e.g., the model is applied to the portion of programming code). As described herein, such an assessment can comprise an indication of whether the input portion of programming code contains a security event. An indication of the category of the event can also be indicated in the assessment.

At 250, the security event assessment of the input portion of programming code is output.

The automated nature of the method 200 can be used in a variety of situations such as determining when to generate a security logging statement, verifying whether current security logging statements are accurate, or the like.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receiving" input programming code can be described as "sending" depending on perspective.

Example 4—Example Programming Code

In any of the examples herein, programming code can be source code, object code, partially compiled code or the like. In practice, source code is used because it provides easy access to tokens derived from words (e.g., with semantic content) used by the programmer when authoring the code, thus providing a high probability that the tokens will prove helpful for making a determination of whether the code contains a security event, the category of such event, or both, especially in the context of topic modeling. However, in some cases, such tokens can be extracted from object code, partially compiled code, or the like.

In any of the examples herein, the portion of programming code can comprise (e.g., or be limited to a) method (e.g., in Java, C++, or some other programming language), block of code, or the like. Thus, source code methods can be used as input to the machine learning model.

When methods are used, further parameters about the method (e.g., length, number of parameters, number of declared variables, combined number of parameters and declared variables, number of IF/ELSE blocks, or the like) can be included in the machine learning process to improve predictive power, accuracy, or the like.

Example 5—Example Tokens

In any of the examples herein, a token can be a string of alphanumeric characters. In practice, such tokens are, or are portions of, words authored by programmers of the input programming code. Thus, tokens can be, or can be derived from, words appearing in source code, such as variable names, procedure names, method names, operands, and the like.

In any of the examples herein, tokens can be filtered to remove words that are considered unhelpful for determining whether programming code contains a security event. For example, common generic programming reserved words (e.g., "for," "if," "not," or the like) can be removed. Other common words or strings can be removed (e.g., if they do not contribute to predictive power).

A tokenizer can generate the tokens from the input programming code. In practice, the tokenizer parses the input programming code and can perform other functionality such as stemming, filtering keywords, and splitting compound words into separate tokens (e.g., based on camel case or underscore parsing as described herein).

Example 6—Example Security Logging Statement

In any of the examples herein, a security logging statement can be a statement that generates a security log entry. In practice, such a statement can indicate a security event has taken place. As described herein, the statement can also indicate a security event category.

In practice, the statement may call other software that performs the actual task of writing the security log entry to a log. The log entry typically indicates a timestamp, location within the programming code, the security event category, and possibly description and/or context (e.g., "Validation failure for user abc123 in sValidateUser"). In practice, codes, references to a dictionary, or enumerated types can be used in place of text.

As described herein, a security logging statement can be added to programming code by software. In practice, a skeleton or default security logging statement can be generated and placed in code for approval and/or modification by a programmer. Such a statement can include the category determined by a machine learning model as described herein. Other information (e.g., the method in which the security event was detected) can also be included.

The techniques described herein can be modified to detect whether a security logging statement is already present in the input programming code. If so, such an indication can be included as part of the assessment. In such a case, the need to add a security logging statement is typically less because one is already there. Accordingly, such code can be filtered from presented as needing a security logging statement.

Example 7—Example Determination of Whether Code Contains a Security Event

In any of the examples herein, a determination of whether programming code contains a security event can be made via a trained machine learning model. In practice, such a determination is a prediction and may not be one hundred percent accurate. An accompanying confidence score (e.g., probability) can be generated to indicate the likelihood that the prediction is correct. Such a confidence score can be stored in conjunction with an indication of whether the programming code contains a security event. Such a confidence score can be presented proximate an indication based on the determination (e.g., in a user interface).

A determination of whether programming code contains a security event can comprise predicting whether a security event is present within the programming code.

Example 8—Example Security Events

In any of the examples herein, a security event can be any operation or activity in code that relates to a security-relevant issue. In practice, such events are defined according to various standards and definitions which may vary from enterprise to enterprise. A variety of possible security event categories (e.g., authentication, authorization, or the like) are described herein. Such categories can be arranged from sub-categories as shown.

Of particular interest are security failures, such as validation failures, cryptography failures, or the like. However, successful security functionality can also be logged as described herein. Software which considers a security operation to be successful may have mistakenly accepted compromised credentials or the like.

Example 9—Example Machine Learning Model

In any of the examples herein, a machine learning model can be a set of processes that revolve around training and prediction. The examples described herein focus on classification, but other techniques can be used. As described herein, topic modeling can be particularly powerful in the security event context. Therefore, examples show Latent Dirichlet Allocation (LDA), and other topic modeling implementations are possible.

In practice, the model can include or work in conjunction with support software for training, marshalling inputs, pre-processing, post processing (e.g., analyzing outputs to construct an assessment as described herein), or the like.

Such models are stored in computer-readable media and are executable with input data to generate an automated classification or prediction.

The trained machine learning model can output a probability (or confidence) score with any classification. Such a probability score can indicate how likely it would be that the input code would be assigned to a label associated with an exemplar vector. The confidence score can be used as a rank to order classification or simply be used in conjunction with a threshold. For mutually exclusive classification (e.g., security event is present or not), a comparison can be used (e.g., the higher of the two prevails). However, thresholds can still be used to indicate confidence in any case.

Confidence scores can also be used to color code displayed assessments (e.g., using red, yellow, green to indicate high, medium, or low confidence scores).

Example 10—Example Model Training

Figure 3:
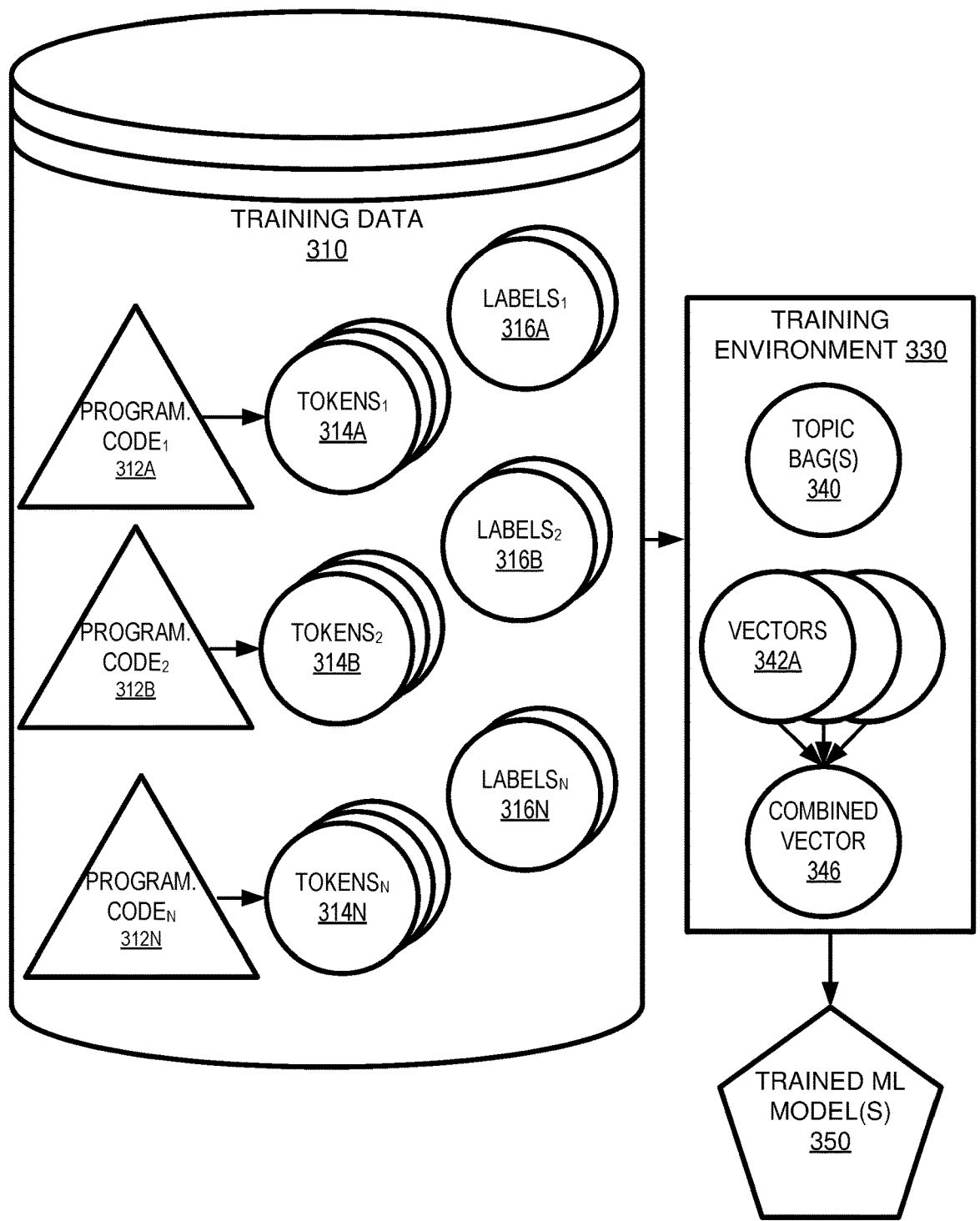
FIG. 3 is a block diagram of an example system training a machine learning model that analyzes programming code.

FIG. 3 is a block diagram of an example system 300 training a machine learning model that analyzes programming code; such a trained model can be used to generate a security assessment as described herein. In the example, the training data 310 includes portions 312A-N of programming code have been tagged with labels 316A-N to indicate whether or not they contain security events, the category of security event, or the like. The portions 312A-N thus serve as training programming code. Tokens 314A-N are generated from the program code as described herein.

In practice, a training environment 330 can provide support for generating machine learning models and can be used to filter training data, apply labels, store intermediate results, validate models, and the like. In the example, in the training environment 330, one or more topic bags 340 are generated as part of Latent Dirichlet Allocation (LDA) topic modeling. Vectors 342A are generated for respective of the portions 312A-N of program code. Vectors sharing a common label are combined into a combined vector 346. The topic bag(s) and combined vector(s) can then be included in the trained machine learning model 350.

In practice, different models can be used for different security event assessment types, or common infrastructure can be leveraged (e.g., models can share topic bags but vectors can be maintained in separate models, or the like).

In practice, security logging statements themselves can be excluded (e.g., for training purposes, security logging statements are removed from original portions) from the portions 312A-N before generating tokens 314A-N. Such an approach typically helps improve accuracy when determining whether subsequent (new) input portions of programming code have security logging statements.

In any of the examples herein, training can be performed by an entity separate from the entity using the model. For example, training can be performed beforehand by a vendor, and a trained model can be shared among multiple customers. However, internal training may also be performed if desired.

Example 11—Example Method of Training a Machine Learning Model

Figure 4:
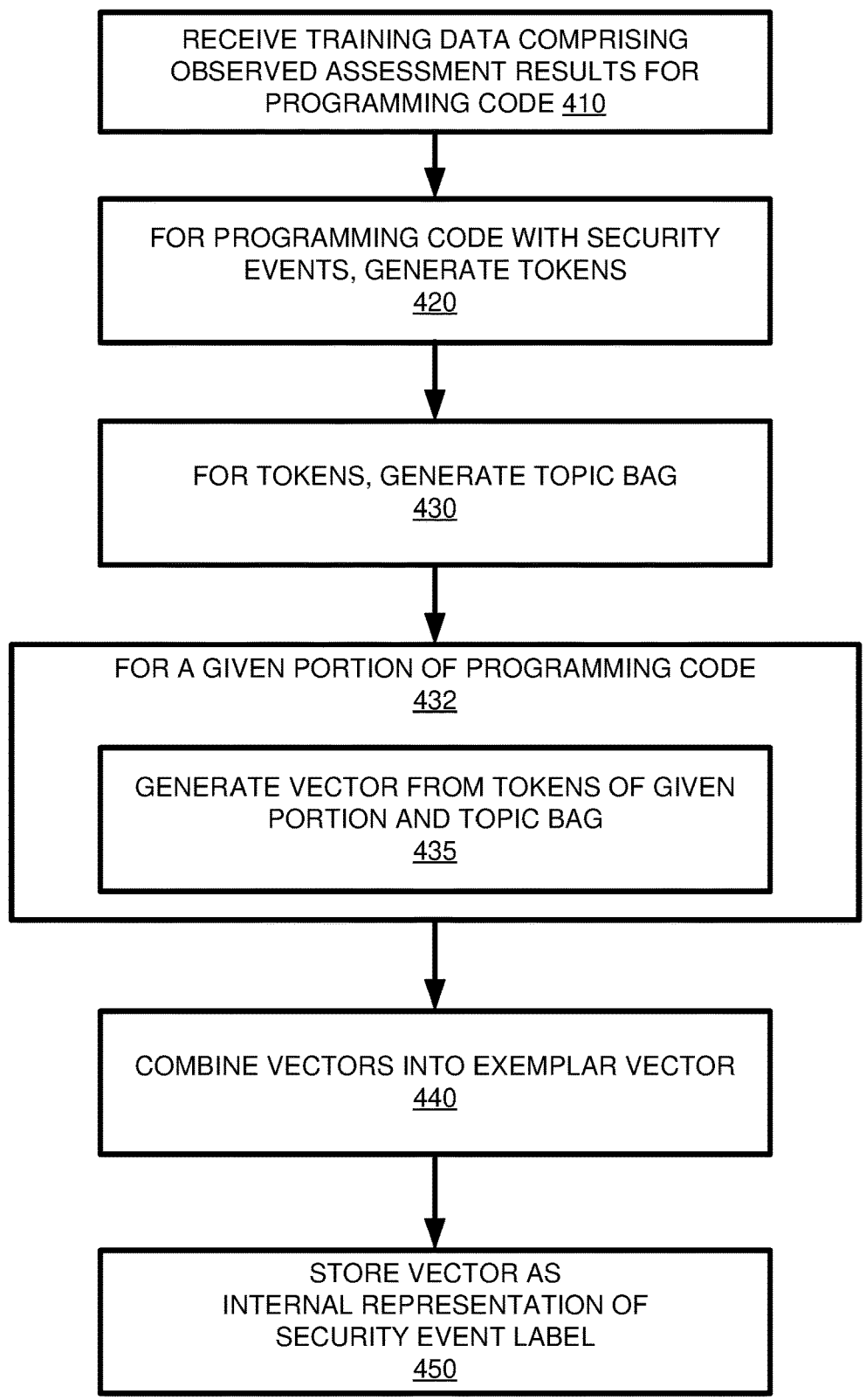
FIG. 4 is a flowchart of an example method of training a machine learning model that analyzes programming code for security events.

FIG. 4 is a flowchart of an example method 400 of training a machine learning model that analyzes programming code for security events and can be implemented in any of the examples herein (e.g., the system shown in FIG. 3).

At 410, training data comprising observed (e.g., known) assessment results for portions of programming code is received. For example, portions of programming code can be tagged according to whether they contain a security event, the security event category, or the like. As described herein, input programming code can be segmented into methods, blocks or the like.

At 420, tokens are generated for the portions of programming code that contain a security event. As described herein, any security logging statements can be excluded when generating tokens. The process can be repeated for portions that do not contain a security event. As described herein, one way of determining whether an observed portion contains a security event is by detecting whether a security logging statement is present.

At 430, a topic bag is generated for the tokens using Latent Dirichlet Allocation (LDA) topic modeling.

At 432, for a given portion of programming code, at 435, a vector is generated from the tokens of the given portion and the topic bag. The portions of programming code have labels that indicate an observed (e.g., known) condition of the portion (e.g., whether it contains a security event, the category of the security event, or the like).

At 440, for those portions of programming code sharing a label, the vectors are combined into an exemplar vector for the label. For example, the vectors can be averaged, combined according to a weighted mean, or the like.

At 450, the combined vector is stored as an internal representation of the security event label. In practice, a set of labels can be stored to represent a security event assessment type (e.g., presence, category, or the like).

The process can be repeated for plural security event assessment types.

Validation can proceed to verify that the model is generating meaningful predictions. In practice, some of the test data can be withheld as data to be used during model validation.

Example 12—Example Security Event Assessment Types

Figure 5:
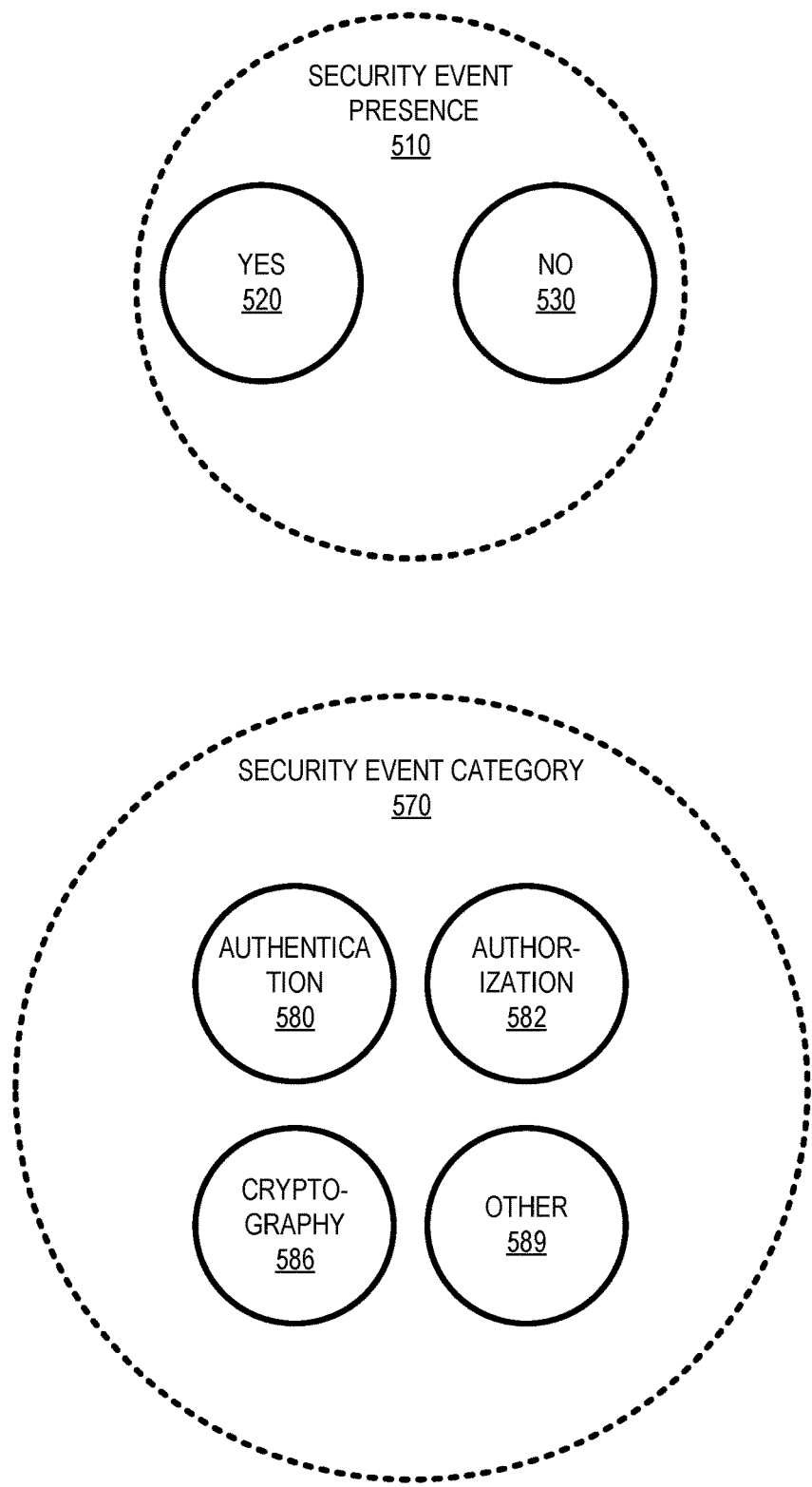
FIG. 5 is a block diagram showing example security event assessment types.

FIG. 5 is a block diagram showing example security event assessment types 510 and 570.). In any of the examples herein, security event labels can be used (e.g., as labels or tags) to train a machine learning model that ultimately outputs a tag that is incorporated in a security event assessment. For example, security event presence 510 is a security event assessment type comprising the labels "Yes" 520 and "No" 530. In practice, an assessment can provide such labels to indicate the presence of a security event (e.g., an indication of whether an input portion of programming code contains a security event).

Security event category 570 is a security event assessment type comprising the labels "authentication" 580, "authorization" 582, "cryptography" 56, and possibly others 589. In practice, an assessment can provide such labels to indicate the category of security event (e.g., of a security event predicted to be in an input portion of programming code).

Security event assessment labels can be associated with respective, different exemplar vectors. For the security event presence assessment type, an implementation may proceed with a single vector because the two results are mutually exclusive (e.g., a threshold value for "Yes" can indicate whether a security event is present without having to resort to a "No" vector); however, two vectors can be used as described herein.

In practice, the labels can be represented internally using codes, enumerated types, numbers, or the like.

From a machine learning perspective, the different security event assessment types 510, 570 can have their own topic bags (e.g., topics are generated separately), but an implementation that uses a common topic bag is possible.

Example 13—Example Security Event Categories

In any of the examples herein, a security event category can indicate a type of security event present in input programming code. Such categories can be chosen along lines that help distinguish events for purposes of reviewing the relevant logs. In practice, different organizations have adopted security event categories based on standards or online resource as described herein. Thus, categories can vary from organization to organization.

Example security event categories comprise authentication, authorization, cryptography, validation failures, monitoring system events, errors, and the like. Due to overlap, categories can be combined or omitted as desired. Sub-categories can be supported.

Example 14—Example System Outputting Security Event Assessment

Figure 6:
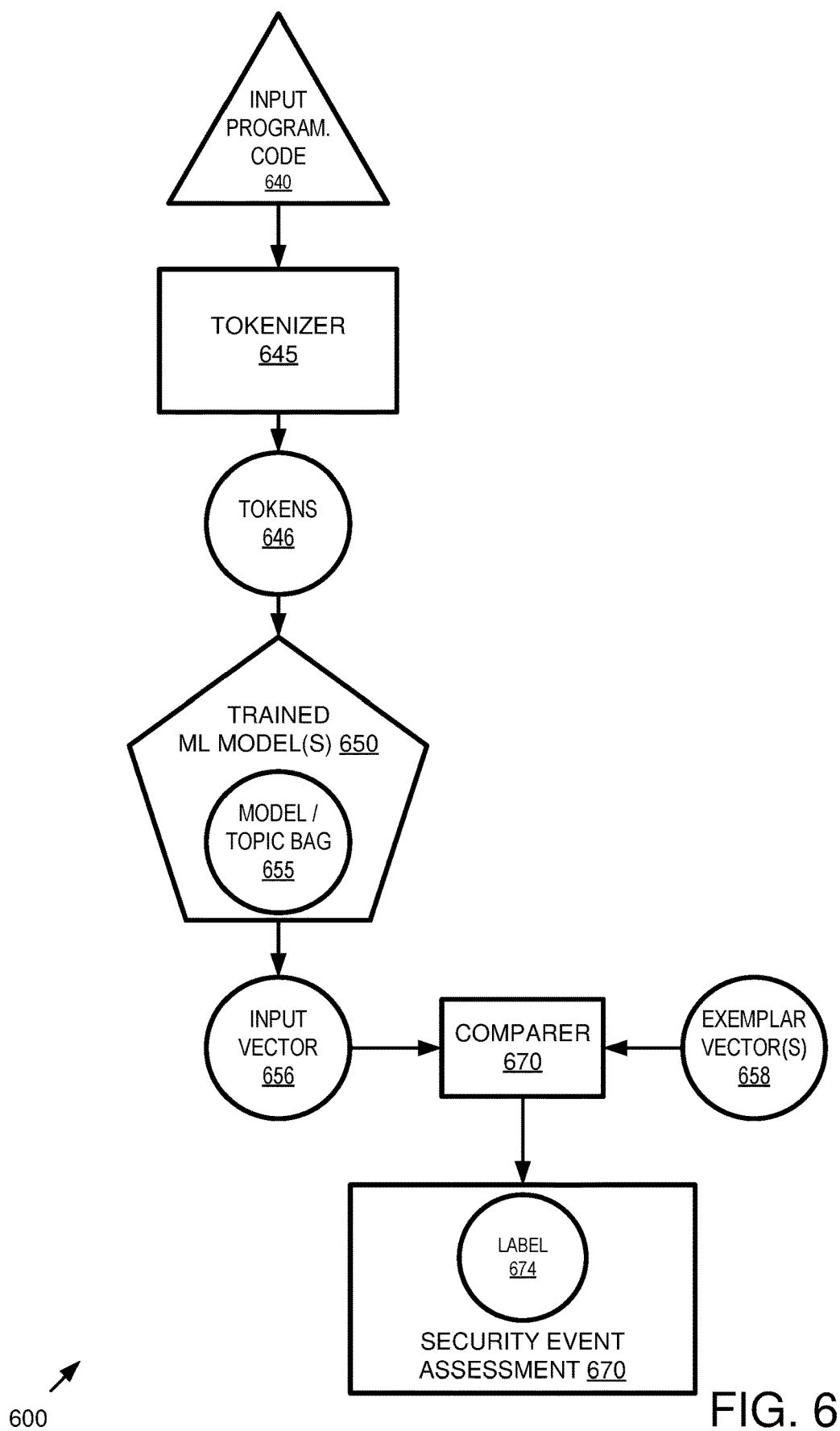
FIG. 6 is a block diagram of an example system employing a trained machine learning model that outputs a security event assessment.

FIG. 6 is a block diagram of an example system 600 employing a trained machine learning model 650 that outputs a security event assessment 670 and can be used in any of the examples herein to generate such an assessment 670.

In the example, a tokenizer 645 receives an input portion of programming code 640 and outputs tokens 646. As described herein, some common tokens can be filtered out as not helpful. Token splitting can also be implemented as described.

The trained machine learning model 650 comprises a topic bag 655 and receives the tokens 646; it outputs a vector 656, which can serve as an internal stored representation of the input programming code 640. As described herein, the model 650 can be trained with observed portions of source code known to have security events.

A comparer 670 can then receive the vector 656 and one or more exemplar vectors 658 for security event labels and, based on the comparison results, output a security event assessment 670, which contains a determined (e.g., predicted) label 674. A system can predict multiple labels as described herein (e.g., one indicating whether or not the input programming code 640 contains a security event and another indicating the category of the security event). As described herein, the comparer 670 can compute cosine similarity for vectors and choose the vector with the greatest similarity as the most likely vector and use the label associated with the most likely vector as the label 674. In some cases, plural results may exceed a threshold, so multiple labels 674 are possible per assessment. For example, the input programming code 640 may contain security events of multiple, different categories.

As described herein, the exemplar vector(s) can be generated as part of the training process.

Although a single model 650 can be used, plural, different models can be used for different security event assessment types (e.g., one for presence, and one for category).

The assessment 670 can then trigger further actions, such as adding a security logging statement to the code 640, which ultimately results in a security log entry in a log when the security event occurs.

Example 15—Example Method Outputting Security Event Assessment

Figure 7:
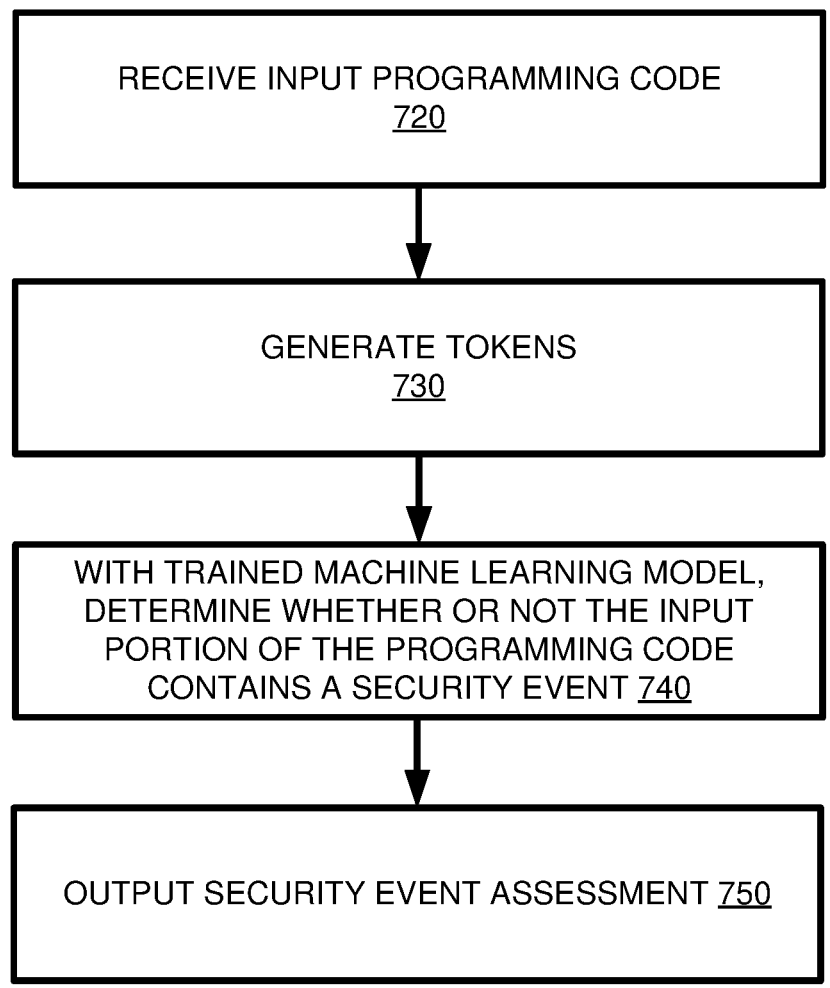
FIG. 7 is a flowchart of an example method outputting a security event assessment of input programming code via a trained machine learning model.

FIG. 7 is a flowchart of an example method 700 outputting a security event assessment of input programming code via a trained machine learning model that can be used in any of the examples herein and can be performed, for example, by the system of FIG. 6.

At 720, a portion of input programming code is received.

At 730, tokens are generated from the input programming code. As described herein, various filtering and pre-processing of the programming code and/or tokens can be implemented. For example multi-word tokens in the input portion of programming code can be split into separate tokens (e.g., via CamelCase, underscore parsing, or the like). Programming language reserved words can be removed from the tokens.

At 740, it is determined, with a machine learning model, whether (or not) the input portion of the programming code contains a security event. For example, a topic modelling machine learning model such as a Latent Dirichlet Allocation (LDA) model can be applied to tokens to generate a vector. The vectors can comprise topic vectors.

The trained machine learning model can generate an internal stored representation of the input portion of the programming code based on the tokens. The model can determine whether the input portion of the programming code contains a security event. As described herein, the machine learning model can be trained with training programming code labeled according to whether or not the training programming code contains security events and generates one or more vectors from the tokens. The internal representation of the code can thus comprise the one or more vectors generated by the machine learning model.

Determining whether the input portion of the programming code contains a security event can comprise comparing the topic vector of the input portion of the programming code to one or more exemplar topic vectors generated as described herein.

At 750, a security event assessment of the input programming code is output. The security event assessment can comprise an indication of whether the input portion of the programming code contains a security event. The indication can be based on the one or more vectors. As described herein, the indication can be the label associated with an exemplar vector most closely matching the vector generated for the input portion of programming code (e.g., a label of "yes" indicates that a security event is present). As described herein, the assessment can also indicate a category of the security event.

As described herein, a skeleton or default security logging statement can be generated and placed in code (e.g., for approval and/or modification by a programmer) responsive to a determination that the code contains a security event. Alternatively, a marker (e.g., comment) can be placed in the code for discovery by subsequent software (e.g., to audit the software for compliance, add a security logging statement, or recommend adding a security logging statement).

As described herein, responsive to determining that the input portion of the programming code contains a security event, the input portion of programming code can be modified to include a security logging statement.

Responsive to determining that the input portion of the programming code contains a security event, a message can be sent to a software development environment indicating that a security logging statement be added to the code. Other approaches include responsive to determining that the code contains a security event, blocking incorporation of the input portion of the programming code until the presence of a security logging statement is confirmed. For example, check-in, compilation, or the like can be blocked.

Other approaches include responsive to determining that the code contains a security event, adding a reference to the code to a list of code flagged for security logging statement addition. A security event assessment user interface as described herein can be used to select the code and add a security logging statement.

Subsequently, when a security logging statement that has been added to the code is compiled and/or executed, as a result of adding the security logging statement, a security log entry is generated (e.g., by execution of the security logging statement or its compiled counterpart).

As described herein, a machine learning model trained to indicate a category of security event can determine a category of security event present in the input portion of the programming code. Such processing can be performed responsive to determining that the code contains a security event.

The security event assessment can serve as an indication of adding a security event logging statement of the determined security event category for the input portion of the programming code.

As a result of the method 700, benefits associated with more consistent, complete, and/or accurate security logging can be achieved.

Figure 8:
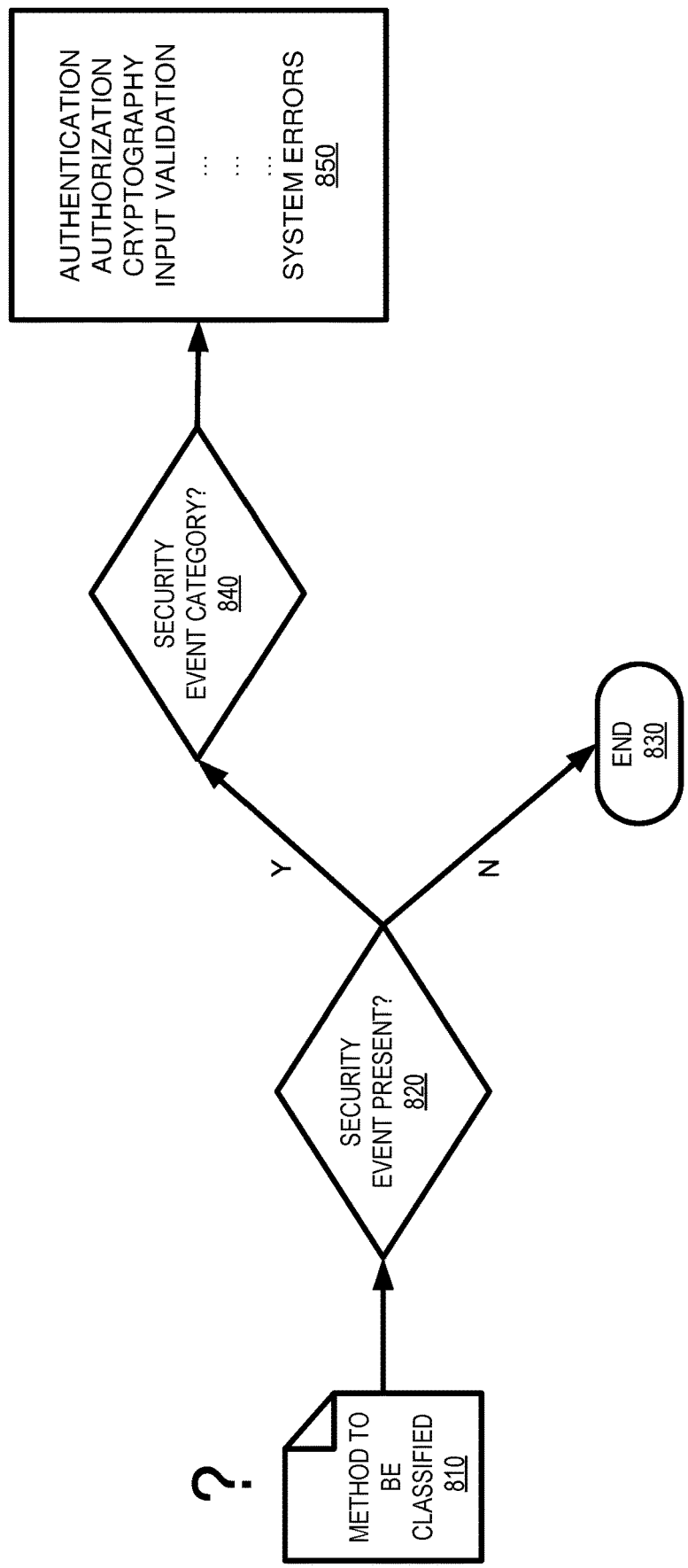
FIG. 8 is a block diagram of an example method that determines both presence and category of a security event in a method to be classified.

Example 16—Example Implementation Determining Both Presence and Category of Security Event FIG. 8 is a block diagram of an example method 800 that determines both presence and category of a security event in a method to be classified 810. In the example, a determination 820 is made of whether the input method 810 contains a security event. If not, the method ends at 830.

If a security event is present, then a determination 840 is made of the category of the security event. The output can be one or more of any of a number of predetermined (e.g., during training) security event categories 850.

Example 17—Example Training Implementation

Model training can proceed as shown in FIGS. 3 and 4. Another, more specific implementation is shown in FIGS. 9, 10, 11, 12, and 13 as described below.

Figure 9:
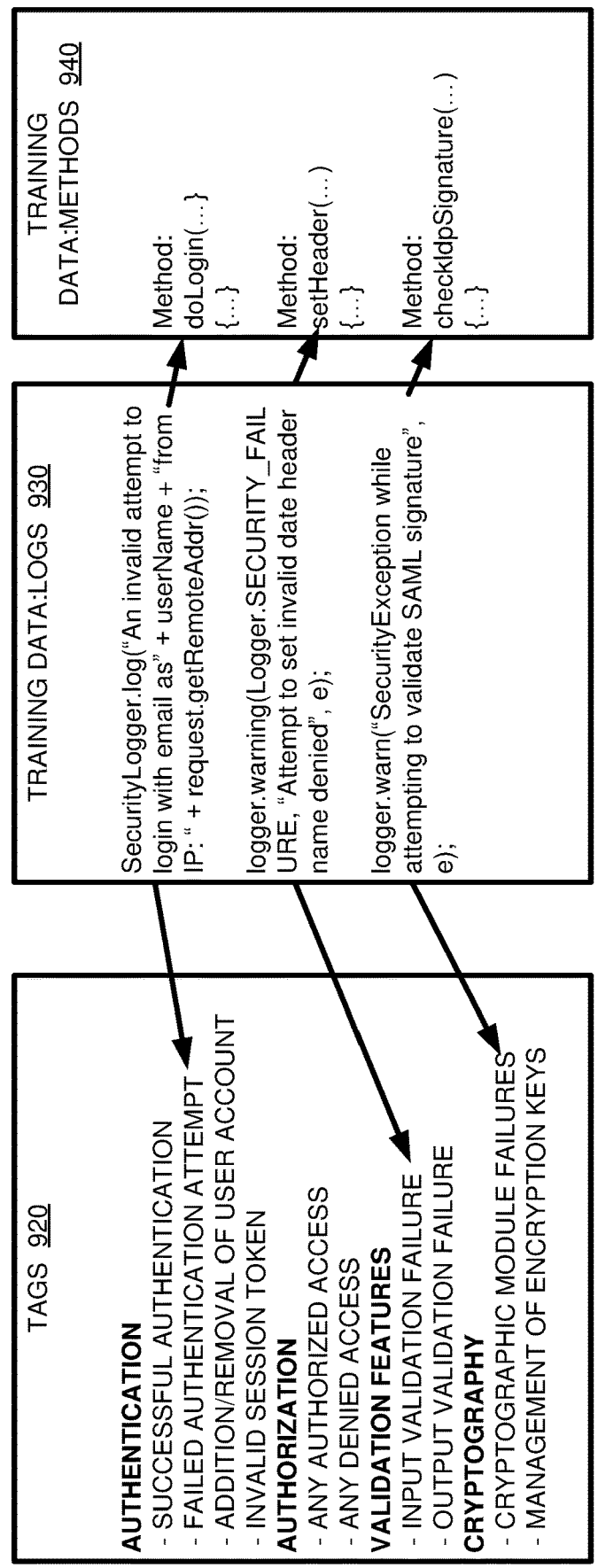
FIG. 9 is a block diagram showing example labelling of logging statements for model training
Figure 10:
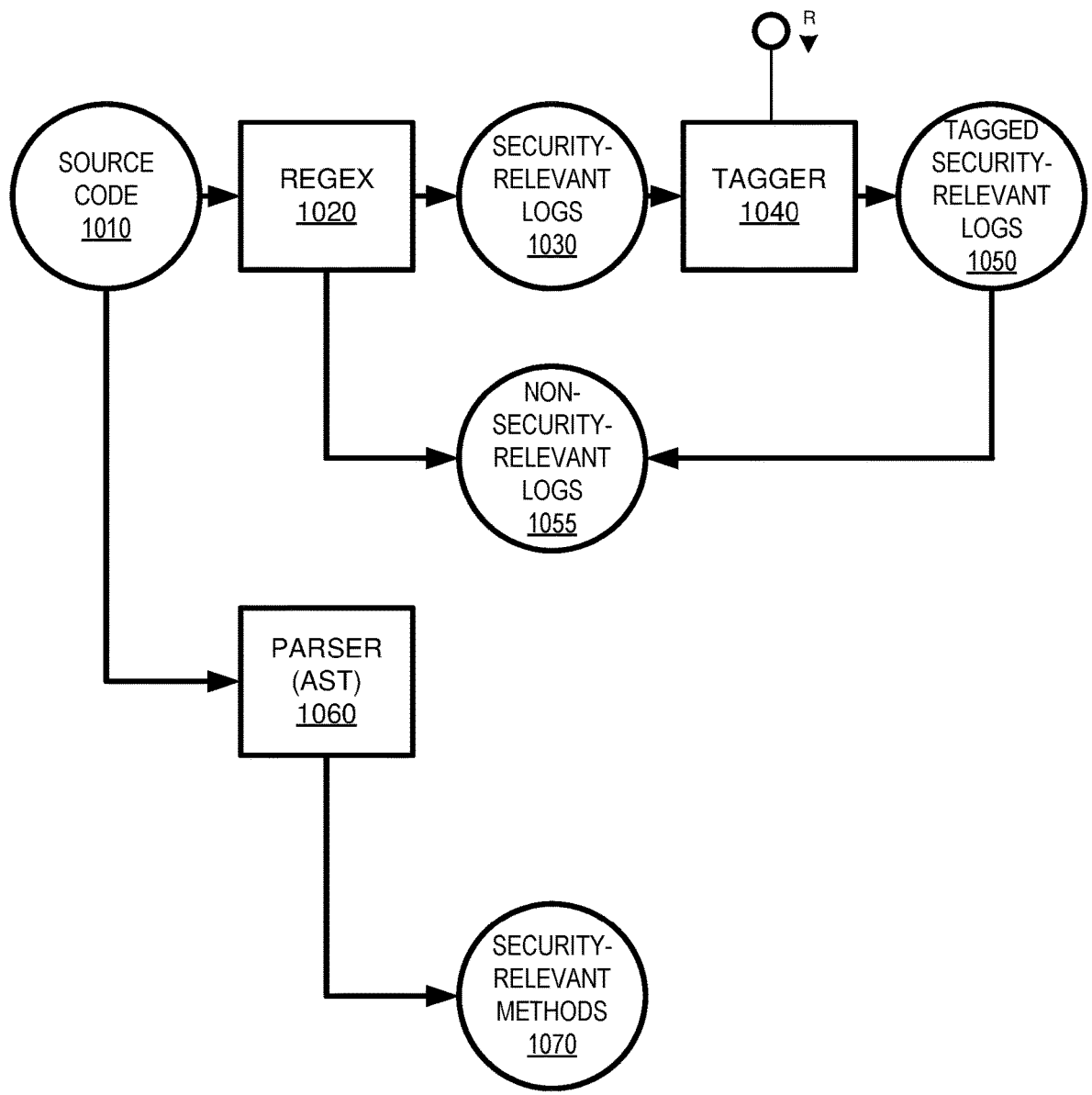
FIGS. 10 and 11 are a block diagram of an example system for training a machine learning model for use in the technologies described herein.
Figure 11:
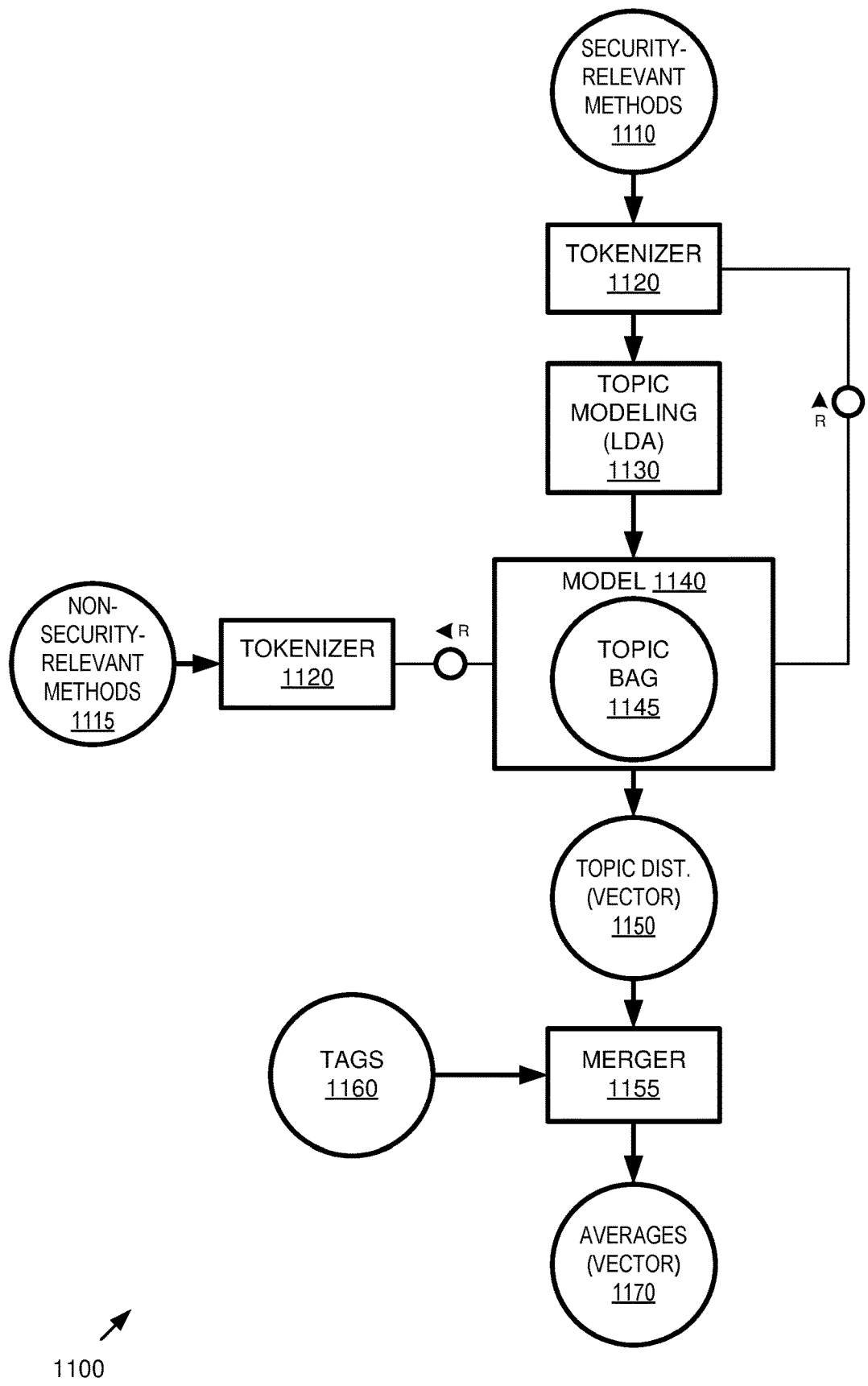

FIG. 9 is a block diagram showing example labelling of logging statement for model training FIGS. 10 and 11 are a block diagram of an example system 1000, 1100 for training a machine learning model that can be used to output a security event assessment.

Training can be started by forming a set of tags/labels to represent the security-related events that are desired to be logged. A list of tags can be extracted from security standards (e.g., NIST, ISO 27002, FedRamp, or the like) that the software is desired to comply with, books, online resources that list various logging recommendations (e.g., OWASP), or a threat modeling exercise that is being applied to the software, which specifies certain monitoring points. Tags can also be grouped under larger categories of interest (e.g., authentication-, authorization-, cryptography-related events or the like).

Existing source code that includes security-relevant logging statements can be leveraged for training. Different data sources can be used, such as open-source applications or the proprietary software within an enterprise.

As shown in FIG. 10, an implementation can start with a set of one or more source code repositories 1010 which are searched for logging statements that are security-relevant and non-security relevant, using regular expressions.

For instance, security relevant logging statement 1030 can be identified using regular expressions 1020 that look for keywords "security"/"audit" words together with "log," "logger," or "logging." Monitoring-relevant keywords can include invalid, fraud, suspicio, tamper, excessive, violat, risk, threat, malicious, exploit, attack, vuln, insecur, unsafe, xxs, xxe, sqli, csrf, ssrf, denial, brute, abnormal, anomal, and the like. Authentication keywords can include authen, session, credential, password, and the like.

Depending on the programming language another regular expression can be applied to get the statement that comply with the generic logging format of the language. For example, in Java, the format could be as follows: <logger_object>.<log_level>(log_statement) or System.out.prinln(<log_statement>).

Similarly, non-security relevant logs 1055 can be identified using regular expressions 1020, by choosing logging statements that do not include any of the "security"/"audit" keywords. For a more reliable ground truth, the data set can be inspected (e.g., manually) to verify that the logs do not include security-relevant events.

Once a set of logging statements is found, a tagger 1040 can tag the security-relevant logs 1030 using the set of tags determined as described above. Manual tagging can be done. In case the whole dataset of security-relevant logging statements is too large to label manually, it is also possible to label part of the dataset, paying attention to the requirement that each category of security event is well represented (e.g., has a sufficient number of labeled samples). Although manual tagging may take time, it only needs to be done during the training phase. Tagging results in the tagged security-relevant logs 1050.

Next, the portions of code (e.g., methods) that contain the selected logging statements can be identified. For example, the source code 1010 can be parsed (e.g., by building the abstract syntax tree (AST) parser 1060—which extracts the security relevant methods 1070 (1110) and the non-security relevant methods 1115. Methods containing security-relevant logging statements are marked (tagged) as security-relevant methods, and the ones that contain non-security-relevant logging statements are marked (tagged) as non-security relevant methods.

FIG. 9 shows some example logging statements, shows how they can be tagged, and represents the extraction of the set of methods in which they are located.

The tags 920 are the list of security-relevant events (e.g., security categories), the training data 930 shows security-relevant logs, and the training data 940 shows the security-related methods, collected from existing software.

Note that there is an underlying assumption that if there is a security-relevant log statement in the code, the code contains a security event (which therefore should be subject to security logging and logged).

To train the machine learning model that can identify whether or not a method contains a security event, a topic modeling process can be used on the source code tokens extracted from the security-relevant methods.

As shown in FIG. 11, a tokenizer 1120 parses and extracts the source code tokens textually. Such tokenization can include splitting tokens (e.g., alphanumeric strings, compound words, or the like) that use CamelCase or underscore into plural, separate tokens (e.g., "CountAccess" becomes "count" and "access"; "Count_Access" becomes "count" and "access"). Tokens can be normalized (e.g., converted to lowercase), and language-specific words such as reserved words (e.g., in Java, if, else, while, for, const, and the like) can be removed. Text pre-processing processes such as stemming and lemmatization can also be applied. Note that the logging statements themselves can be removed from the method before extracting the tokens. FIG. 12 shows an example list of source code tokens 1220 extracted from methods shown in FIG. 9.

Then, a topic modelling process 1130 (e.g., Latent Dirichlet Allocation) is applied to the source code tokens extracted from the security-relevant methods 1110. This results in the model 1140/topic bag 1145 that comprises a set of topics, each specified by a set of tokens. Example topics 1230 are shown in the arrangement 1200 of FIG. 12. Although LDA is shown, other topic model processes can be used.

The topics 1230 extracted by the LDA model are abstract in the sense that they may not have a one-to-one match with the security event labels (tags). In general, each security event label is expected to have different levels of correlation to the LDA topics, as described herein.

As part of model generation, various hyper-parameters can be adjusted. In one case, a model with 45 topics proved to have predictive power with 71% accuracy, 93% precision, and 65% recall (for presence) and accuracy in the 63-87% range for authentication, authorization, monitoring, cryptography, system events, and errors categories.

Next, the labeled methods (labeled for presence of security event, category of security event, or both) are used to correlate the LDA topics to the labels.

In practice, the LDA model 1140 can be applied to the source code tokens extracted from each labeled method. This results in a vector of topic distribution probability scores (topic distribution vector 1150) for each method, where each element of the vector corresponds to the probability of matching with one of the LDA topics.

Next, a merger process 1155 takes into account the tags 1160 of the methods, and for each tag (e.g., each security event label), computes a combination of the vectors associated with the label to generate a single exemplar vector 1170 of topic distributions that represents the label. Such an exemplar topic vector can serve as an internal representation of the security event label as described herein. The vectors can be combined in a variety of ways, such as averaging, computing weighted mean, or the like.

Figure 13:
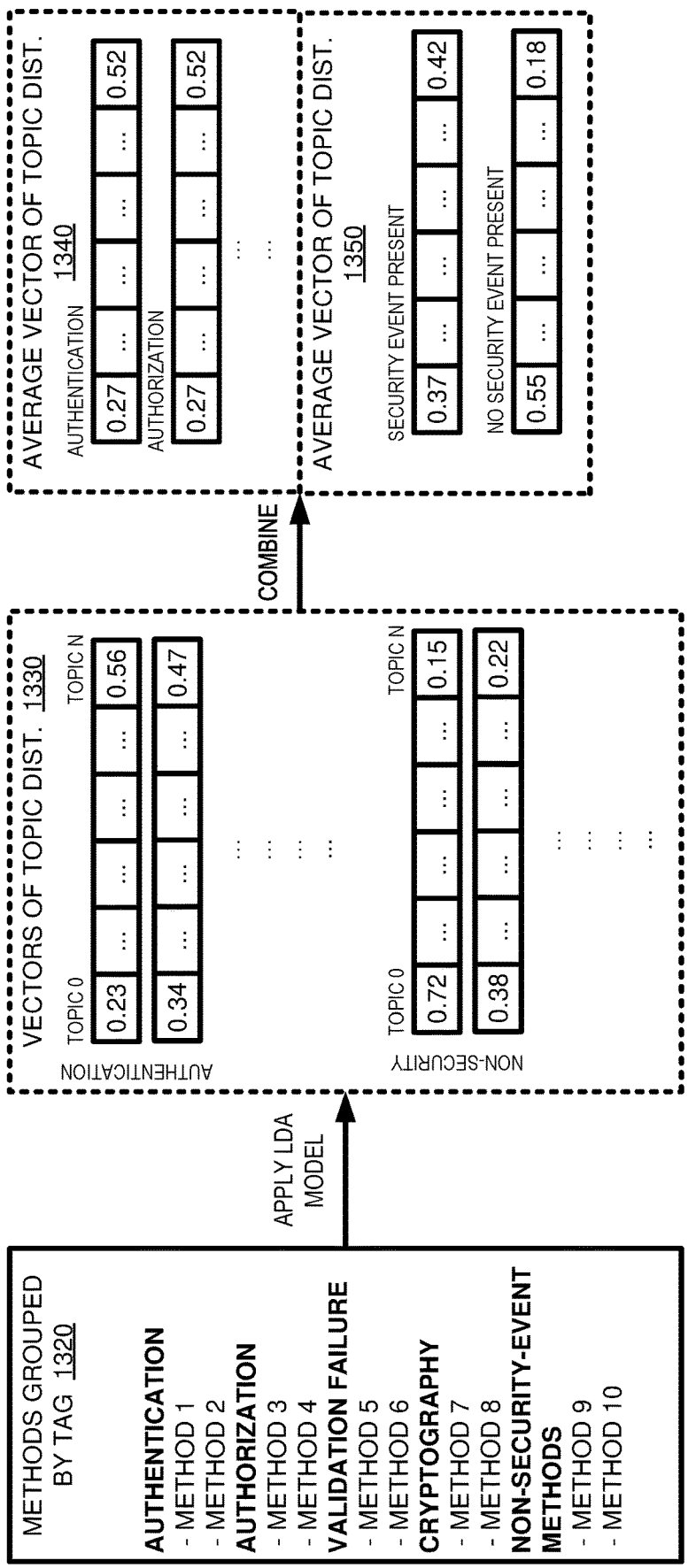
FIG. 13 is a block diagram showing vector processing as part of machine learning model training

FIG. 13 shows an example arrangement 1300 with the high-level categories 1320 of security events such as authentication and cryptography, the multiple vectors 1330, and the resulting combined vectors per label 1340 (e.g., one exemplar vector per security event category). In the implementation, a combined vector for the security-relevant methods and a combined vector for the non-security-relevant methods is computed. The two vectors 1350 allow determination of whether or not an input method contains a security event.

Example 18—Example Classification Implementation

Figure 14:
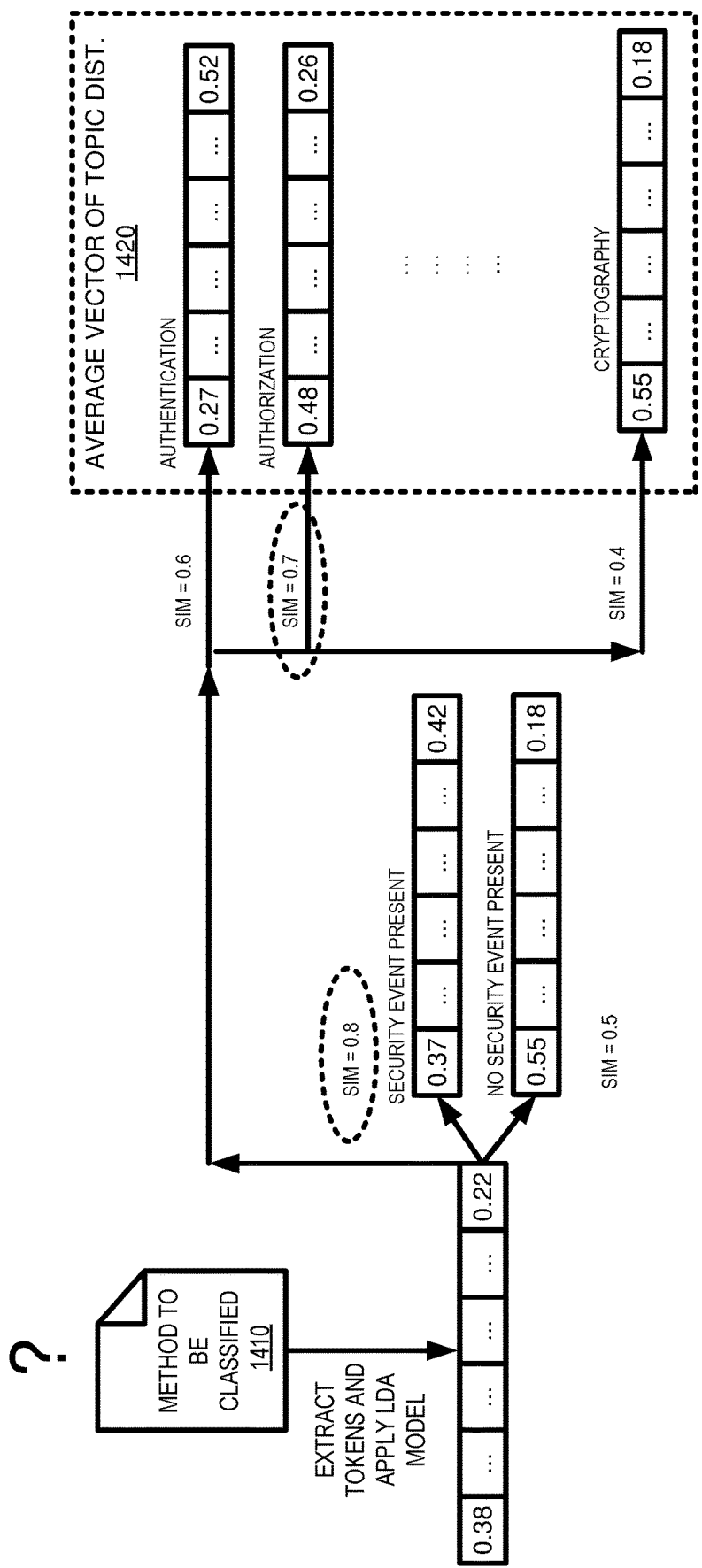
FIG. 14 is a block diagram of an example system determining both presence and category of one or more security events in a method to be classified.

Classification can proceed as shown in FIGS. 6 and 7. Another, more specific implementation is shown in FIGS. 14 and 15 as described below.

Referring to FIG. 6 using the per-method approach, to classify an incoming ("new") method 640 (e.g., without a known tag), the source code tokens 646 can be extracted using a tokenizer 645. The model 650/topic bag 655 can be applied to generate the vector of topic distributions 656.

A comparer 670 can then use the exemplar topic vector described above to decide if the new method 640 contains a security event (e.g., is security relevant) or not (e.g., is non-security relevant). If yes, it can continue to decide on the security event category label 674, which can be output as part of the security event assessment 670. Alternatively, the label 674 can simply indicate whether the method 640 contains a security event.

Figure 15:
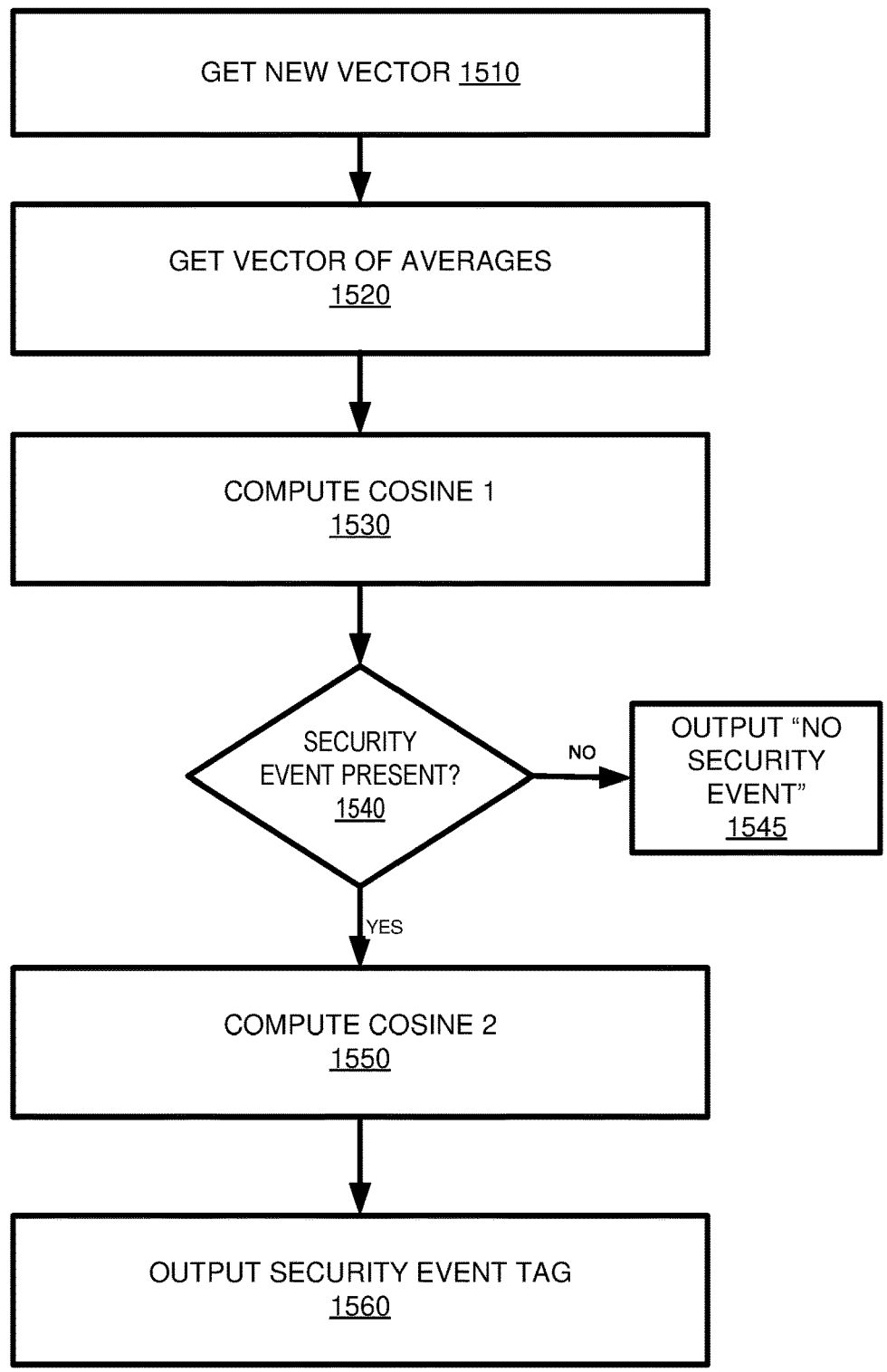
FIG. 15 is a flowchart of an example method determining both presence and category of one or more security events in a method to be classified.

As shown in a method 1500 of FIG. 15, the vector for the new method can be generated at 1510. Then, the exemplar topic vector for a security event presence label (e.g., "yes") can be obtained at 1520. Cosine similarity can be computed at 1530. The same can be done for the label indicating no security event presence (e.g., "no"). At 1540, the label with the higher cosine is considered to be the better match. If "no" is a better match, then an indication of no security event present can be output at 1545.

On the other hand, if a security event is determined to be present, another similarity comparison can be performed 1550 with the cosine similarities of the vectors of the different security event category labels (e.g., "authentication" etc.), and the security event category can be output at 1560 based on the comparison.

At this point, one option is to take the highest similarity score (e.g., "Authorization") of the vectors 1420 of the arrangement 1400 in FIG. 14 as the label for the incoming method 1410. However, because methods in software may not always follow the single-responsibility principle and might have lower cohesion, there could be a one-to-many relationship between the methods and the security event categories (labels). So, a given method can have high similarity scores with the topic vectors of multiple tags. Thus, depending on the software, a threshold can be set, and security event categories above the threshold can be output as part of the assessment.

Example 19—Example User Interface

FIG. 16 is a block diagram of an example user interface 1600 indicating results of security event assessment that can be used in any of the examples herein. In the example, a security event assessment user interface 1600 displays a user interface element for inputting the source 1610 of the incoming methods. Results 1650 are displayed that indicate whether each method was determined to have a security event and the type of event by applying the machine learning model as described herein. A user can select the relevant methods and activate an add user interface element 1620 to add a security logging statement to the one or more selected methods.

Example 20—Example Implementation

A method, system, or one or more computer-readable media can implement the following implementation.

One or more non-transitory computer-readable media comprising computer-executable instructions that, when executed by a computing system, cause the computing system to perform operations comprising receiving an input portion of source code; generating tokens from the input portion of the programming code; with a trained Latent Dirichlet Allocation (LDA) machine learning model, generating a topic vector representation of the tokens; with the topic vector representation of the tokens, determining whether or not the input portion of source code contains a security event; responsive to determining that the input portion of source code contains a security event, determining a security event category of the security event with the topic vector representation of the tokens; and outputting an indication of adding a security event logging statement of the determined security event category for the input portion of the programming code.

Example 21—Use Cases

The machine-learning-based technologies described herein can be applied in a variety of scenarios.

For example, code can be analyzed by the technologies to determine which portions contain security events. If no logging statement is already present, then one can be added.

Because security events can be located within the code, another use case is to embed a honeytoken (e.g., as part of an authentication failure) to lead a potential attacker to stay engaged, allowing longer surveillance of the attacker.

The techniques can also be used to confirm compliance of code with security standards (e.g., by determining whether a security logging statement is present when a security event is detected).

Example 22—Example Implementations

Any of the following embodiments can be implemented.

Clause 1. A computer-implemented method comprising:
receiving an input portion of programming code;
generating tokens from the input portion of the programming code;
with a trained machine learning model, generating an internal stored representation of the input portion of the programming code based on the tokens and determining whether the input portion of the programming code contains a security event, wherein the trained machine learning model is trained with training programming code labeled according to whether or not the training programming code contains security events and generates one or more vectors from the tokens; and
outputting a security event assessment, wherein the security event assessment comprises an indication of whether the input portion of the programming code contains a security event, and the indication is based on the one or more vectors.

Clause 2. The method of Clause 1, further comprising:
responsive to determining that the input portion of the programming code contains a security event, modifying the input portion of the programming code to include a security logging statement.

Clause 3. The method of Clause 2, further comprising:
as a result of adding the security logging statement, generating a security log entry.

Clause 4. The method of any one of Clauses 1-3, further comprising:
splitting multi-word tokens in the input portion of the programming code into separate tokens.

Clause 5. The method of any one of Clauses 1-4, wherein:
the one or more vectors generated from the tokens are generated with a topic bag created during training; and
the topic bag is generated via Latent Dirichlet Allocation with observed portions of source code from which security logging statements have been removed.

Clause 6. The method of any one of Clauses 1-5, wherein:
the trained machine learning model applies topic modeling.

Clause 7. The method of any one of Clauses 1-6, wherein:
the trained machine learning model applies Latent Dirichlet Allocation (LDA).

Clause 8. The method of any one of Clauses 1-7, wherein:
the one or more vectors comprises a topic vector;
the internal stored representation of the input portion of the programming code comprises the topic vector; and
the determining comprises comparing the topic vector to one or more exemplar topic vectors.

Clause 9. The method of any one of Clauses 1-8, further comprising:
responsive to determining that the input portion of the programming code contains a security event, sending a message to a software development environment indicating that a security logging statement be added to the input portion of the programming code.

Clause 10. The method of any one of Clauses 1-9, further comprising:
responsive to determining that the input portion of the programming code contains a security event, blocking incorporation of the input portion of the programming code.

Clause 11. The method of any one of Clauses 1-10, wherein:
responsive to determining that the input portion of the programming code contains a security event adding a reference to the input portion of the programming code to a list of code flagged for security logging statement addition.

Clause 12. The method of any one of Clauses 1-11, further comprising:
with a machine learning model trained to indicate a category of security event, determining a category of security event present in the input portion of the programming code.

Clause 13. The method of any one of Clauses 1-12, further comprising:
removing programming language reserved words from the tokens.

Clause 14. The method of any one of Clauses 1-13, wherein:
the trained machine learning model outputs a probability score of a particular security event label.

Clause 15. A computing system comprising:
at least one hardware processor;
at least one memory coupled to the at least one hardware processor;
an input portion of source code;
a trained machine learning model trained with observed portions of source code known to have security events; and
one or more non-transitory computer-readable media having stored therein computer-executable instructions that, when executed by the computing system, cause the computing system to perform:
receiving the input portion of programming code;
with the trained machine learning model, determining whether or not the input portion of programming code contains a security event; and
outputting a security event assessment, wherein the security event assessment comprises an indication of whether the input portion of the programming code contains a security event, and the indication is based on one or more vectors.

Clause 16. The system of Clause 15, wherein:
the trained machine learning model applies Latent Dirichlet Allocation (LDA) and generates a topic vector based on tokens generated from the input portion of programming code.

Clause 17. The system of any one of Clauses 15-16, further comprising:
splitting single words of the input portion of programming code into multiple tokens according to camel case.

Clause 18. The system of any one of Clauses 15-17, further comprising:
splitting single words of the input portion of programming code into multiple tokens according to underscore parsing.

Clause 19. The system of any one of Clauses 15-18, wherein:
the trained machine learning model comprises a topic bag generated during training with observed portions of programming code from which security logging statements have been removed.

Clause 20. One or more non-transitory computer-readable media comprising computer-executable instructions that, when executed by a computing system, cause the computing system to perform operations comprising:
receiving an input portion of source code;
generating tokens from the input portion of the source code;
with a trained Latent Dirichlet Allocation (LDA) machine learning model, generating a topic vector representation of the tokens;
with the topic vector representation of the tokens, determining whether or not the input portion of source code contains a security event;
responsive to determining that the input portion of source code contains a security event, determining a security event category of the security event with the topic vector representation of the tokens; and
outputting an indication of adding a security event logging statement of the determined security event category for the input portion of the source code.

Clause 21. One or more non-transitory computer-readable media comprising computer-executable instructions that, when executed by a computing system, cause the computing system to perform the method of any one of Clauses 1-14.

Example 23—Example Advantages

A number of advantages can be achieved via the technologies described herein. For example, code that contains security events but does not have any security logging statement represents a failure to follow best security practices. Such failure can impact security auditing for compliance, incident analysis, incident reconstruction, attack detection, attack prevention, and the like.

Machine learning features can be used to identify which portions of programming code should have a security logging statement added. Manual review of code may be impossible due to the lack of expertise, time, and sheer volume of the task. Further, machine learning operates differently than manual review. Non-linear relationships between instances can be recognized and detected beyond what is possible by a manual reviewer.

Such technologies can greatly reduce the number of errors, leading to more consistent security logging.

As a result, the technologies can improve the overall security of software and related networks.

Finally, a well-orchestrated security assessment as carried out by the technologies described herein can avoid failure or downtime of equipment that was not properly protected (e.g., resulting in loss, waste, or misallocation of resources).

Example 24—Example Computing Systems

Figure 17:
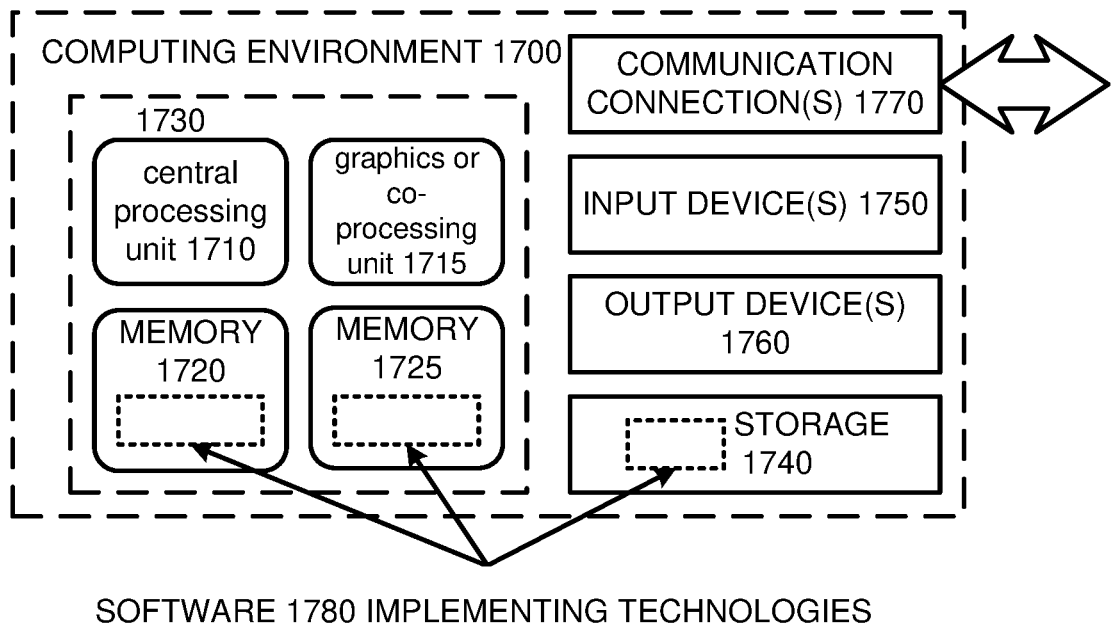
FIG. 17 is a block diagram of an example computing system in which described embodiments can be implemented.

FIG. 17 depicts an example of a suitable computing system 1700 in which the described innovations can be implemented. The computing system 1700 is not intended to suggest any limitation as to scope of use or functionality of the present disclosure, as the innovations can be implemented in diverse computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 can be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 stores software 1780 implementing one or more innovations described herein, in the form of computer-executable instructions suitable for execution by the processing unit(s) 1710, 1715.

A computing system 1700 can have additional features. For example, the computing system 1700 includes storage 1740, one or more input devices 1750, one or more output devices 1760, and one or more communication connections 1770, including input devices, output devices, and communication connections for interacting with a user. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 can be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 can be an input device such as a keyboard, mouse, pen, or trackball, a voice input device, a scanning device, touch device (e.g., touchpad, display, or the like) or another device that provides input to the computing system 1700. The output device(s) 1760 can be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 25—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 26—Example Cloud Computing Environment

Figure 18:
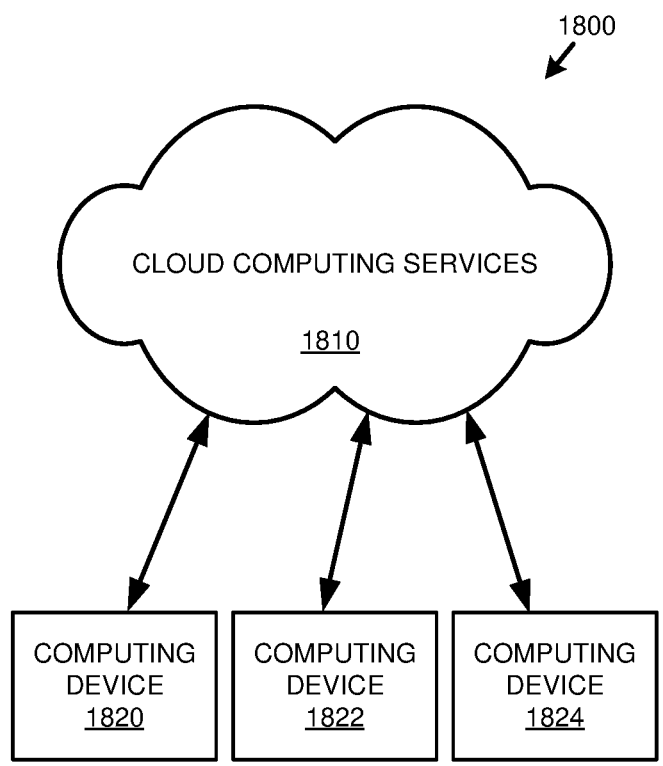
FIG. 18 is a block diagram of an example cloud computing environment that can be used in conjunction with the technologies described herein.

FIG. 18 depicts an example cloud computing environment 1800 in which the described technologies can be implemented, including, e.g., the system 100 of FIG. 1 and other systems herein. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operations (e.g., data processing, data storage, and the like).

In practice, cloud-based, on-premises-based, or hybrid scenarios can be supported.

Example 27—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 28—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
receiving an input portion of a programming code;
generating tokens from the input portion of the programming code;
with a trained machine learning model, generating an internal stored representation of the input portion of the programming code based on the tokens and determining whether the input portion of the programming code contains a security event, wherein the trained machine learning model is trained with training programming code labeled according to whether or not the training programming code contains security events and generates one or more vectors from the tokens;
outputting a security event assessment, wherein the security event assessment comprises an indication of whether the input portion of the programming code contains a security event, and the indication is based on similarity measurement between the one or more vectors and one or more first exemplar topic vectors included in the trained machine learning model; and
responsive to determining that the input portion of the programming code contains a security event, modifying the input portion of the programming code, wherein the modifying comprises adding a security logging statement to the input portion of the programming code, wherein execution of the security logging statement added to the input portion of the programming code generates a security log entry.

2. The method of claim 1, further comprising:
splitting multi-word tokens in the input portion of the programming code into separate tokens.

3. The method of claim 1, wherein:
the one or more vectors generated from the tokens are generated with a topic bag created during training; and
the topic bag is generated via Latent Dirichlet Allocation with observed portions of the training programming code from which security logging statements have been removed.

4. The method of claim 1, wherein:
the trained machine learning model applies topic modeling.

5. The method of claim 1, wherein:
the trained machine learning model applies Latent Dirichlet Allocation (LDA).

6. The method of claim 1, wherein:
the one or more vectors comprises a topic vector;
the internal stored representation of the input portion of the programming code comprises the topic vector; and
the determining comprises measuring cosine similarity between the topic vector and the one or more first exemplar topic vectors.

7. The method of claim 1, further comprising:
responsive to determining that the input portion of the programming code contains a security event, sending a message to a software development environment indicating that a security logging statement be added to the input portion of the programming code.

8. The method of claim 1, further comprising:
responsive to determining that the input portion of the programming code contains a security event, blocking incorporation of the input portion of the programming code.

9. The method of claim 1, wherein:
responsive to determining that the input portion of the programming code contains a security event, adding a reference to the input portion of the programming code to a list of code flagged for security logging statement addition.

10. The method of claim 1, further comprising:
responsive to determining that the input portion of the programming code contains a security event, determining a category of the security event present in the input portion of the programming code based on similarity measurement between the one or more vectors and one or more second exemplar topic vectors included in the trained machine learning model, wherein the one or more second exemplar topic vectors are different from the one or more first exemplar topic vectors.

11. The method of claim 1, further comprising:
removing programming language reserved words from the tokens.

12. The method of claim 1 wherein:
the trained machine learning model outputs a probability score of a particular security event label.

13. A computing system comprising:
at least one hardware processor;
at least one memory coupled to the at least one hardware processor;
a trained machine learning model trained with observed portions of source code known to have security events; and
one or more non-transitory computer-readable media having stored therein computer- executable instructions that, when executed by the computing system, cause the computing system to perform:

receiving an input portion of a programming code;
with the trained machine learning model, determining whether or not the input portion of the programming code contains a security event;
outputting a security event assessment, wherein the security event assessment comprises an indication of whether the input portion of the programming code contains a security event, and the indication is based on similarity measurement between one or more vectors and one or more exemplar topic vectors included in the trained machine learning model; and
responsive to determining that the input portion of the programming code contains a security event, modifying the input portion of the programming code, wherein the modifying comprises adding a security logging statement to the input portion of the programming code, wherein execution of the security logging statement added to the input portion of the programming code generates a security log entry.

14. The system of claim 13, wherein:
the trained machine learning model applies Latent Dirichlet Allocation (LDA) and generates a topic vector based on tokens generated from the input portion of the programming code.

15. The system of claim 13, further comprising:
splitting single words of the input portion of the programming code into multiple tokens according to camel case.

16. The system of claim 13, further comprising:
splitting single words of the input portion of the programming code into multiple tokens according to underscore parsing.

17. The system of claim 13, wherein:
the trained machine learning model comprises a topic bag generated during training with observed portions of the source code from which security logging statements have been removed.

18. One or more non-transitory computer-readable media comprising computer-executable instructions that, when executed by a computing system, cause the computing system to perform operations comprising:
receiving an input portion of a source code;
generating tokens from the input portion of the source code;
with a trained Latent Dirichlet Allocation (LDA) machine learning model, generating a topic vector representation of the tokens;
with the topic vector representation of the tokens, determining whether or not the input portion of source code contains a security event based on similarity measurement between the topic vector representation of the tokens and one or more first exemplar topic vectors included in the trained machine learning model; and
responsive to determining that the input portion of source code contains a security event, determining a security event category of the security event based on similarity measurement between the topic vector representation of the tokens and one or more second exemplar topic vectors included in the trained machine learning model, wherein the one or more second exemplar topic vectors are different from the one or more first exemplar topic vectors; and modifying the input portion of the source code, wherein the modifying comprises adding a security event logging statement of the determined security event category to the input portion of the source code, wherein execution of the security logging statement added to the input portion of the source code generates a security log entry.

\* \* \* \* \*